(12) United States Patent
Agrawal et al.

(10) Patent No.: US 10,649,199 B2
(45) Date of Patent: May 12, 2020

(54) COVERT INFORMATION VIEWING SYSTEM AND METHOD OF COVERT INFORMATION PROCESSING

(71) Applicant: Performance Indicator, LLC, Lowell, MA (US)

(72) Inventors: Satish Agrawal, Concord, MA (US); M. Glenn Horner, West Roxbury, MA (US); Frank J. Bottari, Acton, MA (US); Clifford W. Parker, New Ipswich, NH (US)

(73) Assignee: BAMBU VAULT LLC, Lowell, MA (US)

( * ) Notice: Subject to any disclaimer, the term of this patent is extended or adjusted under 35 U.S.C. 154(b) by 736 days.

(21) Appl. No.: 15/000,585

(22) Filed: Jan. 19, 2016

(65) Prior Publication Data

US 2016/0313549 A1     Oct. 27, 2016

Related U.S. Application Data

(60) Provisional application No. 62/105,279, filed on Jan. 20, 2015.

(51) Int. Cl.
*G02B 23/12* (2006.01)
*F21V 9/30* (2018.01)
*G02F 1/1335* (2006.01)
*H04N 5/33* (2006.01)
*G02B 5/20* (2006.01)

(52) U.S. Cl.
CPC ............... *G02B 23/12* (2013.01); *F21V 9/30* (2018.02); *G02F 1/1335* (2013.01); *H04N 5/33* (2013.01); *G02B 5/208* (2013.01); *G02F 2203/11* (2013.01)

(58) Field of Classification Search
CPC ........ G02B 23/12; G02B 5/208; G02B 27/01; F21V 9/30; H04N 5/33; G09G 31/3426
USPC .......................................................... 250/330
See application file for complete search history.

(56) References Cited

U.S. PATENT DOCUMENTS

| | | | |
|---|---|---|---|
| 7,960,688 B2 | 6/2011 | Agrawal et al. | |
| 8,097,843 B2 | 1/2012 | Agrawal et al. | |
| 8,120,239 B2 | 2/2012 | Cheon et al. | |
| 8,247,761 B1 | 8/2012 | Agrawal et al. | |

(Continued)

FOREIGN PATENT DOCUMENTS

EP          1837920 A1 *  9/2007  ............. G02B 5/281

*Primary Examiner* — David P Porta
*Assistant Examiner* — Abra S Fein
(74) *Attorney, Agent, or Firm* — Morgan, Lewis & Bockius LLP

(57) ABSTRACT

A covert information viewing system converts visible light to infrared wavelengths that can be transmitted for detection by an infrared-sensitive detector, such as night vision goggles, without detection by the human eye. The system includes a visible light information source emitting radiation as visible light, and a covert covering including an energy converting layer for absorbing the visible light emitted from the visible light information source and converting the visible light to infrared wavelengths, and a light blocking layer capable of absorbing unconverted visible light and transmitting infrared wavelengths. The covert covering is attached to the visible light information source and oriented to cover visible light emitted from the visible light information source, but it is also easily removed from the visible light information source.

19 Claims, 2 Drawing Sheets

(56) References Cited

U.S. PATENT DOCUMENTS

| | | | | |
|---|---|---|---|---|
| 2009/0059575 | A1* | 3/2009 | Crow | F21K 2/06 |
| | | | | 362/191 |
| 2010/0316861 | A1* | 12/2010 | Kubler | C08J 5/18 |
| | | | | 428/220 |
| 2012/0080613 | A1* | 4/2012 | Kingsley | C09K 11/025 |
| | | | | 250/459.1 |
| 2013/0215599 | A1* | 8/2013 | Davis | F21V 9/40 |
| | | | | 362/84 |
| 2014/0319328 | A1* | 10/2014 | Hsieh | H05K 13/046 |
| | | | | 250/221 |
| 2016/0033822 | A1* | 2/2016 | Jiang | G02F 1/13338 |
| | | | | 349/33 |

* cited by examiner

COVERT INFORMATION VIEWING SYSTEM AND METHOD OF COVERT INFORMATION PROCESSING

BACKGROUND OF THE INVENTION

The ability to covertly process information is important in the operations of military, law enforcement, surveillance, and hunting. Normal information processing utilizing visible light cannot be used during covert conditions, especially in darkness, as the visible light can compromise the sender's position. Such usage is also problematic for situations in which stealth conditions must be maintained in the dark but at the same time information from the display must be visible.

Electronic information displays present a particular problem. The use of these devices has become ubiquitous for displaying information of all kinds. For example, soldiers in the field constantly rely on information displays such as laptop computers, tablets, cell phones, GPS devices to obtain information critical to their operation. At night time and in the dark, these screens are readily visible over long distances due to the emission of visible light which can compromise covert operations. With the advent of bright LED backlit displays, the visible light can easily be seen over long distances and hence the danger of compromising cover operations has become greater.

Maintaining stealth conditions when using information displays is also difficult and time consuming and can easily be compromised. For example, when the use of a display is required, a light-blocking hood must first be deployed over the display before it is turned on. The hood is to block all visible light emanating from the display. Then the observer must put their head under the hood and turn on the display to read it. After obtaining the required information, the display must be turned off and then the hood removed. An additional complication is that night vision goggles are routinely worn in dark conditions to improve vision. Night vision goggles work by detecting and amplifying infrared light to which the human eye is not sensitive. The goggles must be removed before viewing a display screen because the brightness of the display will damage the goggles and render them unusable. Goggle removal is cumbersome and adds additional time to the process of reading the information. This process for viewing a display screen in the dark under stealth conditions increases the amount of time it takes to obtain the information, adding inefficiencies to the operation. There is also a high likelihood that inadvertent leakage of light will occur, compromising the covert operation. There is, therefore, a need to process information emanating from a display which emits in the infrared, but not in the visible, in the dark under stealth conditions and that can be read using an infrared detector such as night vision goggles. There is also a need to be able to easily use a standard display device both in the standard visible mode and infrared mode.

Covert observation of one's surroundings is another aspect of covert information processing. For example, in order to navigate a road in the dark, the road must be illuminated and the information of the observed images processed. For covert operations, visible light cannot be used so there is a need for efficient infrared illumination and the information read using an infrared detector. In the same way that covert observation of one's surroundings can be made possible by providing sufficient infrared illumination for interrogation with infrared detectors, visible information used for identification or authentication can be hidden such that only an infrared signal can be detected. It would be advantageous if standard visible light sources including headlights, flashlights, and light stick illuminators could be quickly and easily converted to efficient infrared illuminators when needed and then back again.

BRIEF SUMMARY OF EMBODIMENTS OF THE INVENTION

Disclosed is a system for absorbing visible light emanating from an information source and converting the detectable visible light to infrared wavelengths by passing the visible light through an energy converting layer easily attached in front of the information source. Further disclosed is a method of covert information processing wherein a film is placed in optical contact with the visible information source, wherein the film comprises an energy conversion layer that is proximate to the surface of the visible energy source, and further wherein the visible information is converted to infrared wavelengths by the placement of energy converting film in front of the visible light source. The information can only be detected and read using an infrared imaging device such as night vision goggles.

These and other embodiments are described in detail below.

BRIEF DESCRIPTION OF THE DRAWINGS

Referring now to the drawings wherein like elements are numbered alike in several FIGURES.

DETAILED DESCRIPTION OF THE INVENTION

Figure 1:
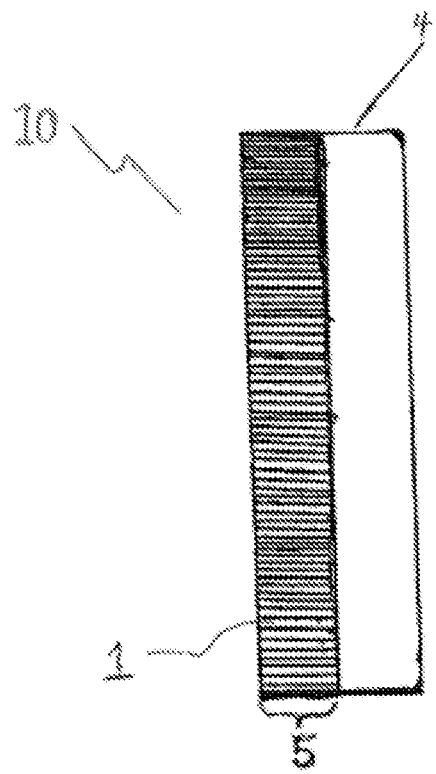
FIG. 1 is a covert information viewing system (10) comprising a visible light information source (4), and a covert covering (5), which in this case consists of an energy conversion layer (1).
Figure 2:
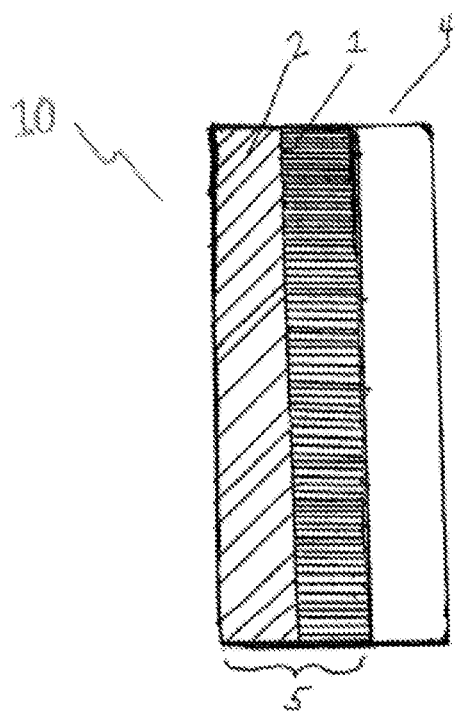
FIG. 2 is a covert information viewing system (10) comprising a visible light information source (4), and a covert covering (5), which in this case includes an energy conversion layer (1) and a blocking layer (2).
Figure 3:
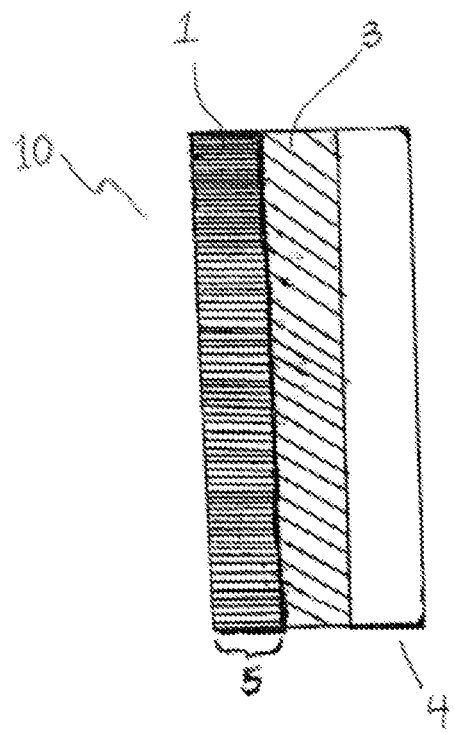
FIG. 3 is a covert information viewing system (10) comprising a visible light information source (4), a covert covering (5) consisting of an energy conversion layer (1), and an adhesive layer (3) disposed between the information light source (4), and the energy conversion layer (1).
Figure 4:
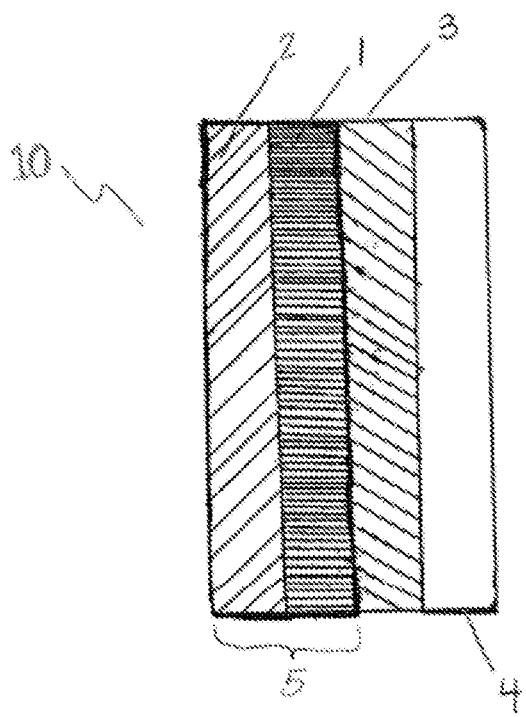
FIG. 4 is a covert information viewing system (10) comprising a visible light information source (4), and a covert covering (5), which in this case includes an energy conversion layer (1) and a blocking layer (2), and an adhesive layer (3) disposed between the information light source (4), and the energy conversion layer (1).

As used herein, the term "visible light" refers to light visible to humans, which corresponds to a wavelength range of 390 to 700 nanometers.

As used herein, "infrared wavelengths" refers to a wavelength range of greater than 700 nanometers to about 1.5 micron.

As used herein, the term "visible light information source" refers to a source that transmits information in the form of visible light. The information can be in the form of signals (e.g., binary signals or Morse code signals), text, encrypted text, images, encrypted images, or a combination of the foregoing.

According to one aspect of the invention, a covert information viewing system is provided. The system comprises a visible light information source to which a covert covering is attached in an orientation to eliminate detectable visible light emanating from the visible light information source.

According to some aspects of the invention, a method of covert information processing is provided which comprises removably attaching a covert covering comprising an energy conversion layer on or in front of the visible light information source so that at least a portion of the visible light is converted to infrared wavelengths as it passes through the covert covering.

Energy conversion with specific functional overlayers is described in U.S. Pat. Nos. 7,960,688, 8,097,843, and 8,247,761 to Agrawal et al. The energy converting layer contains material that can be in the form of a film or coating or incorporated in a host matrix. Beyond energy conversion there is an additional requirement that any unconverted or residual visible light be of a low enough intensity that it cannot be detected by another human observer. Hence, a visible light blocking layer can, optionally, be employed as part of the covert covering, preferably as a layer separate from the energy converting layer. It has been found that to ensure low residual visible light it is optimal to have a light blocking layer as a separate layer which will further lower the unconverted visible light to a low enough level that it cannot be detected.

Thus, in some embodiments, the covert covering (5) that is attached over the visible light information source (4) can comprise (1) an energy conversion layer which converts visible light to infrared and (2) a blocking layer to reduce intensity of residual visible light. The covering is placed over the visible light information source such that the energy conversion layer is facing the visible light information source and the blocking layer disposed on the surface of the first energy conversion layer is further away from the visible light information source. Proper orientation of the covering to cover detectable visible light when disposed on the visible light information source minimizes air gaps between the energy conversion layer and the visible light information source. Such orientation can allow for better optical contact or refractive index matching to prevents loss of resolution and to enhance clarity of the information carried or enabled.

The blocking layer may either comprise materials that are absorptive of visible light or it may comprise materials that convert some of the residual (unconverted in the first layer) visible light to infrared or both to minimize loss of resolution. The blocking layer is preferably highly transmissive of infrared wavelengths.

In certain embodiments, the visible light information source is an information display device, such as a laptop, a tablet computer, or a mobile phone. In this embodiment the covert covering can be disposed directly on the display screen, or the covert covering can be attached to the display screen via a static friction layer or an adhesive layer, which can provide the additional advantage of better matching the refractive indices of the display screen and the energy converting film.

After the covert covering is placed over the visible light information source one can now perform covert information processing by using an infrared emission detector or camera such as a Night Vision Goggle.

In another aspect, the information to be viewed is the external environment. For covert viewing, the environment should be lit with light comprising infrared wavelengths, that is, lacking visible light. In such an aspect, a covert covering as previously described can be placed over a general source of visible light, such as a headlamp or a flashlight, such that visible light is blocked and converted to infrared wavelengths to enhance covert viewing of the environment.

In some embodiments, the visible light source can be a chemiluminescent light stick. In such cases, the covert covering can be in the form of a tube or other shape that completely encloses the chemiluminescent source.

In some embodiments, the covert covering can be directly on the surface of the visible light source, or the covert covering can be attached to the surface of the visible light source via a static friction layer or an adhesive layer.

After the covert covering is placed over the visible light source, the environment lit by the converted light can be viewed by using an infrared emission detector or camera such as a Night Vision Goggle.

In another aspect, the information to be viewed is a graphic design comprising a pattern of infrared light wavelength absorbing elements such as a bar code or QR code that may be printed onto a reflective material. In this aspect, a visible light source can be ambient visible light, or can be visible light from a source directed toward the information. In such an aspect, the covert covering can be a light blocking layer containing energy converting components that can be coated or laminated over the graphic design so as to produce infrared light from the reflective areas of the graphic that can be detected using an infrared emission detector or camera.

In some aspects of the present invention in which the covert covering is placed over a visible light source, the energy converting layer (1) can comprise about 0.7% LUMOGEN™ Red 305 dye, 0.25% LUMOGEN™ Orange 240 dye, and 0.25% LUMOGEN™ Yellow 170 dye, all obtained from BASF Corp. In some embodiments, the dyes can be formulated in a solvent and coated onto a clear polymer substrate at a thickness of 0.003-0.100 inches (76 micrometers to 2.5 millimeters), then heated. The blocking layer (2) can comprise, for example, about 0.8% violanthrone-79, 0.7% metanil yellow, 0.7% acid fuchsin, and 0.25% Unisol Blue. These dyes can be likewise formulated in a solvent and coated onto the first layer at a thickness of 0.005-0.012 inches (127-305 micrometers), then heated. More preferably, the dyes for each layer are uniformly blended with a polymer such as polycarbonate and extruded in film form. The thickness of the energy converting layer (1) at the above concentrations can be 0.002-0.008 inches (50.8-203.2 micrometers). The thickness of the blocking layer (2) at the above concentrations is 0.003-0.009 inches (76-229 micrometers). Different combinations of dye concentrations and film thicknesses are possible.

In certain embodiments, the film layers can be coated, for example tandem coated or individual layers can be coated and laminated. The film layers can also be coextruded or individually extruded and laminated. To the resulting coated or laminated film, an adhesive can then be applied to the energy conversion layer (1). This stiction or adhesive layer (3) allows the film to adhere to the information display surface and serves as an index matching layer to improve optics of the viewed image. The adhesive is of low tack so as to be easily removable.

In another embodiment, the film can be mechanically attached to the display, with or without the adhesive. In cases where an adhesive is not used, additional coatings may be used to optimize the attachment by static friction ("stiction").

In aspects in which a graphic design is hidden by a covert covering, the light blocking layer can include pigments that can absorb shorter wavelengths of visible light while transmitting infrared wavelengths. These can include pigments such as Paliogen™ Black 0086. It is preferred that the light blocking layer also contain dyes or pigments that can convert at least a portion of the external visible light to infrared wavelengths.

The graphic design can be an image printed on a reflective substrate such as white paper or plastic using pigments or toners that absorb significant amounts of light at infrared wavelengths. The light blocking layer may be constructed from at least one layer containing dyes or pigments, and may include an adhesive layer that may be used to attach the light blocking layer to the graphic design.

The method for covert use of information displays is as follows: The energy converting film (5) is attached to the display screen with the energy converting layer (1) toward the display. Attachment can be by adhesive or mechanical means. The covert covering is disposed and oriented on the visible information light source to prevent air gaps so as to minimize loss of resolution in the information being enabled and carried to the observer. The covert covering will prevent visible light from emanating and thus the light source is not visible to the naked eye. However, the display screen is readable with the use of an infrared detector such as night vision goggles.

In some embodiments, such as those where the visible light source (4) is an illumination device which enables illumination of an environment, such as a headlight or flashlight for example, the covert covering (5) can be attached to the light source by various mechanical means such as with clips or other fasteners. The covert covering may also be attached to the visible light source as part of a mechanical housing or the dyes or pigments can be molded into plastic or other materials in various shapes to be attached to the light source. The method of covertly viewing information from the environment is for the covert covering (5) to be attached to and cover the visible light source (4). The covert covering will prevent visible light from emanating and thus the light source is not visible to the naked eye. The light source illumination can be observed with the use of an infrared detector such as night vision goggles to process the images observed. The invention, by virtue of its ability to absorb and convert the visible light of the light source to infrared light and thus increasing the intensity of infrared light, provides a significantly brighter and clearer covert illumination from the visible light information source compared to using only a visible to infrared light filter.

In another embodiment of the invention, the invention can also be used for covert illumination markers such as luminescent light sticks where a plastic tube contains materials that luminesce when mixed together. The method is to cover the light stick with the energy conversion material which can be coated onto the light stick or it can be incorporated into the light stick tube itself by molding for example.

The covert covering uses dyes or phosphors to convert visible light to infrared radiation. Since the emission from energy conversion dyes or phosphors is isotropic (emitted in all directions), the luminance emitted from the material is expected to be Lambertian. In other words, the infrared luminance is isotropic, and the apparent brightness of the surface to an observer is the same independent of the observer's angle of view. This limits the use of the technology to applications where this characteristic is either advantageous or not detrimental. For certain applications (e.g. flashlight, headlights, etc.), it is desirable that the emission be directed in substantially one direction upon leaving the material.

This problem is similar to that occurring in liquid crystal display (LCD) screens, in which light from a light source, typically an illuminated light guide, must be directed essentially normal to the surface of the liquid crystal component cells in order to obtain sufficient contrast ratio. For such an application, brightness enhancement films have been employed. These films use prismatic structures to reject (backward reflect) light that would exit at too large an angle from the surface normal, and use a diffusion film to recycle the rejected light to provide greater axial luminance. Use of such films with energy conversion films would provide significant enhancement of the emitted light in the axial direction by recycling rays that approach at angles that would produce significantly off-axis luminance. This application has particular significance for applications in which a sizable brightness enhancement of near infrared radiance can be gained. This should enhance the performance of films used for directional applications such as flashlights and headlights.

All cited patents, patent applications, and other references are incorporated herein by reference in their entirety, including priority application No. 62/105,279, filed Jan. 20, 2015. However, if a term in the present application contradicts or conflicts with a term in the incorporated reference, the term from the present application takes precedence over the conflicting term from the incorporated reference All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

A solution containing 396 parts toluene, 71 parts ethylene glycol monomethyl ether, 464 parts Neocyl™ B814 acrylic polymer, and 69 parts Plasthall™ P-670 polyester adipate were stirred until well mixed (Polymer Solution 1).

To 845 parts of Polymer Solution 1 was added a slurry containing 7.3 parts Metanil Yellow, 2.9 parts Acid Fuschin, 5.3 parts Unisol Blue, and 1.8 parts Lumogen™ Yellow F170 in 138 parts ethylene glycol monomethyl ether. This fluid was coated at 0.020" wet thickness on 0.005" thick polyester and dried at 40° C. for 4 hours followed by 12 hours at 80° C. to produce a black coating approximately 0.009" thick (Film A).

To 903 parts of Polymer Solution 1 was added a slurry containing 0.38 parts Lumogen Yellow F170, 1.2 parts Lumogen™ F240, 1.62 parts Lumogen™ Red F305, and 0.43 parts Violanthrone-79 in 94 parts ethylene glycol monomethyl ether. This fluid was coated to 0.010" wet thickness on Film B and dried at 40° C. for 4 hours followed by 12 hours at 80° C. to produce a black coating approximately 0.014" thick (Film B). Film B was placed on top of cell phone display such that the polyester substrate was the topmost surface. The cell phone display could be read with a Gen3 Night Vision Goggle (NVG), but could not be detected in a darkened room.

A solution comprising 314 parts of MACE polyurethane 107-268 in 142 part toluene and 142 parts 2-propanol was prepared and combined with 0.3 parts BYK 356 and 0.15 parts BYK 307 in 39 parts 4-methyl-2-pentanone. To this solution was added 125 parts of a solution of 1% Lumogen™ Yellow 170, 125 parts of a 1% solution of Lumogen Orange F240, and 111 part of a 2% solution of Lumogen™ Red F305. This solution was coated on clear polyester at a wet coating thickness of 0.010" and dried at 40° C. for 4 hours followed by 12 hours at 80° C. to give a red coating approximately 0.003" thick (Film C).

To a solution comprising 370 parts of MACE polyurethane 107-268 in 167 parts toluene and 167 parts 2-propanol were added 0.7 part BYK 356 and 0.7 part BYK 307 in 109 parts 4-methyl-2-pentanone, and the mixture was thoroughly stirred. To this solution was added a solution of 0.9 parts Violanthrone-79 in 184 parts 1,3-dioxolane, and the combination thoroughly stirred. To 926 parts of this solution was added 21.3 parts of a slurry containing 34.8 parts Metanil Yellow, 32.3 parts Acid Fuschin, 13 parts Unisol Blue, and 26.1 parts Mace 107-268 polyurethane in 870 parts 1,3-dioxolane, 12 parts toluene, and 12 parts 2-propanol. This combination was thoroughly mixed and coated at a wet thickness of 0.030" on a matte release base, and dried for 4 hours at 40° C. and an additional 12 hours at 80° C. to produce a black layer approximately 0.010" thick (Film D).

Film D was laminated to Film C to produce a black laminate. When this laminate was placed on a cell phone display with the polyester substrate against the display surface, the cell phone display could be read with a Gen3 Night Vision Goggle (NVG), but could not be detected in a darkened room.

An acrylic extrusion was produced from 0.705% LUMOGEN™ Red 305, 0.25% LUMOGEN™ Orange 240, and 0.25% LUMOGEN™ Yellow 170 dissolved in Macrolon 2607-1112 polycarbonate resin, extruded at a thickness of 0.005". This material was laminated to Film D to produce a black film (Film E) that, when the polycarbonate layer was placed against a cell phone display, allowed the cell phone display could be read with a Gen3 Night Vision Goggle (NVG), but prevented detection in a darkened room.

When Film E was placed in front of a military headlamp, it blocked approximately 99.97% of the visible emission energy while producing about 30% of the MR emission without a blocking film.

The invention is further described by the following embodiments, which are non-limiting.

Embodiment 1

A covert information viewing system comprising: a visible light information source emitting radiation as visible light; and a covert covering comprising an energy converting layer capable of absorbing the visible light emitted from the visible light information source and converting the visible light to infrared wavelengths, and a light blocking layer capable of absorbing unconverted visible light and transmitting infrared wavelengths, wherein the covert covering is removably attached to the visible light information source and oriented in position to cover visible light emitted from the visible light information source; and wherein the infrared emission information can be processed using an infrared detector.

Embodiment 2

The covert information viewing system of embodiment 1, wherein the visible light information source is a laptop computer, a tablet computer, a cell phone, or an electronic display device.

Embodiment 3

The covert information viewing system of any one of embodiment 1 to 2, wherein the visible light is emitted in an imagewise pattern.

Embodiment 4

The covert information viewing system of any one or embodiments 1 to 3, wherein the energy converting layer comprises a fluorescent dye.

Embodiment 5

The covert information viewing system of any one of embodiments 1 to 4, wherein the light blocking layer comprises a fluorescent dye capable of producing emission at infrared wavelengths.

Embodiment 6

The covert information viewing system of any one of embodiments 1 to 5, wherein the visible light blocking layer substantially surrounds the energy converting layer.

Embodiment 7

The covert information viewing system of any one of embodiments 1 to 6, wherein the energy converting layer comprises a first surface facing the visible light information source and a second surface facing the visible light blocking layer.

Embodiment 8

The covert information viewing system of any one of embodiments 1 to 7, further comprising a layer disposed on the covert covering that promotes static friction of the covert covering to the visible light source.

Embodiment 9

The covert information viewing system of any one of embodiments 1 to 8, further comprising an adhesive layer disposed on the covert covering that binds the covert covering to the visible light source.

Embodiment 10

A method of covert information processing comprising: providing a visible light information source emitting radiation as visible light, a covert covering comprising an energy conversion layer, and an infrared emissions detector; and removably attaching the covert covering proximate to the information source to cover visible light emitted from the information source; absorbing and converting visible light emitted from the visible light information source to infrared emission information as it passes through the covert covering; and processing infrared emission information emitted from the covert covering with the infrared emission detector.

Embodiment 11

The method of embodiment 10, wherein the visible light information source is a laptop computer, a tablet computer, a cell phone, or an electronic display device.

Embodiment 12

The method of any one of embodiments 10 to 11, wherein the visible light is emitted in an imagewise pattern.

Embodiment 13

The method of any of embodiments 10 to 12, wherein the energy conversion layer comprises a fluorescent dye.

Embodiment 14

The method of any of embodiments 10 to 13, wherein the covert covering further comprises a light blocking layer, the light blocking layer comprising a fluorescent dye capable of producing emission at infrared wavelengths.

Embodiment 15

The method of any of embodiments 10 to 14, wherein the energy conversion layer transmits at least a portion of the visible light emitted from the visible light information source, wherein a visible light blocking layer substantially surrounds the energy conversion layer and substantially absorbs the visible light transmitted through the energy converting layer.

Embodiment 16

A system for covertly viewing an environment comprising: a visible light source that emits radiation as visible light; and a covert covering comprising an energy converting layer capable of absorbing at least a portion of the visible light emitted from the visible light source and converting the absorbed visible light to infrared radiation; and a light blocking layer capable of absorbing unconverted visible light and transmitting infrared wavelengths; wherein the covert covering is removably attached to the visible light source and oriented in position to cover visible light emitted from the visible light emitting surface; and wherein the infrared information from the environment can be viewed using an infrared detector.

Embodiment 17

The system of embodiment 16, wherein the visible light source is a vehicle headlamp, a flashlight, or a chemiluminescent light stick.

Embodiment 18

The system of embodiment 16 or 17, wherein the energy conversion layer comprises a fluorescent dye.

Embodiment 19

The system of any one of embodiments 16 to 18, wherein the light blocking layer comprising a fluorescent dye capable of producing emission at infrared wavelengths.

Embodiment 20

The system of any one of embodiments 16 to 19, wherein the visible light blocking layer substantially surrounds the energy converting layer.

Embodiment 21

The system of any one of embodiments 16 to 20, wherein the energy conversion layer comprises a first surface facing the visible light source and a second surface facing the visible light blocking layer.

Embodiment 22

The system of any one of embodiments 16 to 21, further comprising a layer disposed on the covert covering that promotes static friction of the covert covering to the visible light source.

Embodiment 23

The system of any one of embodiments 16 to 22, further comprising an adhesive layer disposed on the covert covering that binds the covert covering to the visible light source.

Embodiment 24

A method of covertly viewing an environment comprising: emitting visible light from a visible light source; converting the visible light to infrared radiation using a covert covering removably attached proximate to the light source to cover visible light emitted from the light source, the covert covering comprising an energy conversion layer; directing the emitted infrared radiation to an environment to be viewed; and processing infrared emission information collected from the environment with an infrared emission detector.

Embodiment 25

The method of embodiment 24, wherein the visible light source is a vehicle headlamp, a flashlight, or a chemiluminescent light stick.

Embodiment 26

The method of embodiment 24 or 25, wherein the energy conversion layer transmits at least a portion of the visible light emitted from the visible light source, wherein a visible light blocking layer substantially surrounds the energy conversion layer and substantially absorbs the visible light transmitted through the energy converting layer.

Embodiment 27

The method of any one of embodiments 24 to 26, wherein the energy conversion layer comprises a fluorescent dye.

Embodiment 28

The method of any one of embodiments 26 to 27, wherein the light blocking layer comprises a fluorescent dye capable of producing emission at infrared wavelengths.

Embodiment 29

The method of any one of embodiments 26 to 28, wherein the energy conversion layer comprises a first surface facing the visible light source and a second surface facing the visible light blocking layer.

Embodiment 30

The method of any one of embodiments 24 to 29, further comprising a layer disposed on the covert covering that promotes static friction of the covert covering to the visible light source.

Embodiment 31

The method of any one of embodiments 24 to 30, further comprising an adhesive layer disposed on the covert covering that binds the covert covering to the visible light source.

Embodiment 32

A system for hiding information that may be viewed covertly comprising: an information pattern that can be viewed as infrared light; and a visible light blocking film; wherein the visible light blocking film substantially transmits infrared wavelengths.

Embodiment 33

A method of viewing covert information comprising: emitting visible light from a visible light information source; and absorbing and converting visible light emitted from the visible light information source to infrared emission as it passes through a visible blocking film; and imparting information into said infrared wavelengths by reflecting the infrared emission from an information pattern; transmitting said infrared emission through the visible blocking film; and processing infrared emission information collected from visible blocking film with an infrared emission detector.

The invention claimed is:

1. A covert information viewing system comprising:
   a visible light information source configured to emit radiation as visible light; and
   a covert covering comprising:
      an energy converting layer capable of absorbing the visible light emitted from the visible light information source and converting the visible light to infrared wavelengths, and
      a light blocking layer capable of absorbing any residual visible light emitted by the visible light information source that is unconverted by the energy converting layer and transmitting infrared wavelengths,
   wherein the covert covering is removably attached to the visible light information source and oriented in position to cover visible light emitted from the visible light information source; and
   wherein the infrared emission information wavelengths can be processed using an infrared detector.

2. The covert information viewing system of claim 1, wherein the visible light information source is a laptop computer, a tablet computer, a cell phone, or an electronic display device.

3. The covert information viewing system of claim 1, wherein the visible light is emitted in an imagewise pattern.

4. The covert information viewing system of claim 1, wherein the energy converting layer comprises a fluorescent dye.

5. The covert information viewing system of claim 1, wherein the light blocking layer comprises a fluorescent dye capable of producing emission at infrared wavelengths.

6. The covert information viewing system of claim 1, wherein the visible light blocking layer substantially surrounds the energy converting layer.

7. The covert information viewing system of claim 1, wherein the energy converting layer comprises a first surface facing the visible light information source and a second surface facing the visible light blocking layer.

8. The covert information viewing system of claim 1, further comprising a layer disposed on the covert covering that promotes static friction of the covert covering to the visible light source.

9. The covert information viewing system of claim 1, further comprising an adhesive layer disposed on the covert covering that binds the covert covering to the visible light source.

10. A method of covert information processing comprising:
    providing a visible light information source configured to emit radiation as visible light, a covert covering comprising an energy conversion layer and a light blocking layer, and an infrared emissions detector;
    removably attaching the covert covering proximate to the visible light information source to cover visible light emitted from the information source;
    absorbing and converting visible light emitted from the visible light information source to infrared emission information as it passes through the covert covering, wherein the light blocking layer is capable of absorbing any residual visible light emitted by the visible light information source that is unconverted by the covert covering; and
    processing the infrared emission information emitted from the covert covering with the infrared emission detector.

11. The method of claim 10, wherein the visible light information source is a laptop computer, a tablet computer, a cell phone, or an electronic display device.

12. The method of claim 10, wherein the energy conversion layer comprises a fluorescent dye.

13. The method of claim 10, wherein the energy conversion layer transmits at least a portion of the visible light emitted from the visible light information source, wherein a visible light blocking layer substantially surrounds the energy conversion layer and substantially absorbs the visible light transmitted through the energy converting layer.

14. A system for covertly viewing an environment comprising:
    a visible light source that is configured to emit radiation as visible light; and
    a covert covering comprising:
       an energy converting layer capable of absorbing at least a portion of the visible light emitted from the visible light source and converting the absorbed visible light to infrared radiation; and
       a light blocking layer capable of absorbing any residual visible light emitted by the visible light source that is unconverted by the energy converting layer and transmitting infrared wavelengths;
    wherein the covert covering is removably attached to the visible light source and oriented in position to cover visible light emitted from the visible light emitting surface source; and
    wherein the infrared information from the environment radiation can be viewed using an infrared detector.

15. The system of claim 14, wherein the visible light source is a vehicle headlamp, a flashlight, or a chemiluminescent light stick.

16. A method of covertly viewing an environment comprising:

emitting visible light from a visible light source;

converting the visible light to infrared radiation using a covert covering removably attached proximate to the light source to cover visible light emitted from the light source, the covert covering comprising an energy conversion layer and a light blocking layer, wherein the light blocking layer is capable of absorbing any residual visible light emitted by the visible light source that is not converted to infrared radiation;

directing the emitted infrared radiation to an environment to be viewed; and processing infrared emission information collected from the environment with an infrared emission detector.

17. The method of claim 16, wherein the visible light source is a vehicle headlamp, a flashlight, or a chemiluminescent light stick.

18. The method of claim 16, wherein the energy conversion layer transmits at least a portion of the visible light emitted from the visible light source, wherein a visible light blocking layer substantially surrounds the energy conversion layer and substantially absorbs the visible light transmitted through the energy converting layer.

19. A method of viewing covert information comprising:

emitting visible light from a visible light information source;

absorbing and converting visible light emitted from the visible light information source to infrared emission as it passes through a visible light blocking film, wherein the visible light blocking film is capable of absorbing any residual visible light emitted by the visible light information source that is not converted to infrared emission; and imparting information into said infrared wavelengths emission by reflecting the infrared emission from an information pattern;

transmitting said infrared wavelengths emission through the visible light blocking film; and processing infrared emission information collected from the visible light blocking film with an infrared emission detector.

* * * * *